United States Patent [19]

Gutner

[11] 4,202,083

[45] May 13, 1980

[54] METHOD OF MAKING A FURNITURE LEVELING DEVICE

[76] Inventor: Kenneth H. Gutner, Highland Park, Ill. 60035

[21] Appl. No.: 914,396

[22] Filed: Jun. 12, 1978

[51] Int. Cl.² ............................................. B23P 13/00
[52] U.S. Cl. ...................................... 29/150; 29/434; 29/526 R; 10/152 R; 248/300
[58] Field of Search .................... 29/432.2, 434, 150, 29/155 R, 526 R; 10/152 R; 248/300, 188.4, 650

[56] References Cited

U.S. PATENT DOCUMENTS

| | | | |
|---|---|---|---|
| 1,647,992 | 11/1927 | Hartman | 248/188.4 |
| 2,680,326 | 6/1954 | Sultan | 248/188.4 |
| 2,725,667 | 12/1955 | Ingarra | 248/188.4 |
| 2,731,229 | 1/1956 | Seitz | 248/300 |
| 3,010,126 | 11/1961 | Willcox | 10/152 R |
| 3,310,268 | 3/1967 | Kramer | 248/300 X |
| 3,326,503 | 6/1967 | Bade | 248/300 X |
| 3,381,362 | 5/1968 | Church et al. | 29/432.2 |
| 4,109,598 | 8/1978 | Kucher et al. | 29/150 X |

FOREIGN PATENT DOCUMENTS 891875   3/1962   United Kingdom ................. 248/188.4

*Primary Examiner*—Charlie T. Moon
*Attorney, Agent, or Firm*—Tilton, Fallon, Lungmus & Chestnut

[57] ABSTRACT

A method of making a furniture leveling device and product wherein a metal blank is stamped to provide at least a pair of openings which upon further shaping of the blank into a C-shape become aligned, one of the openings having a portion of the blank extruded thereabout to provide a depending metal throat having at least three threads for supporting a bolt, the bolt being adjustable through an opening in the furniture piece for convenient leveling.

3 Claims, 7 Drawing Figures

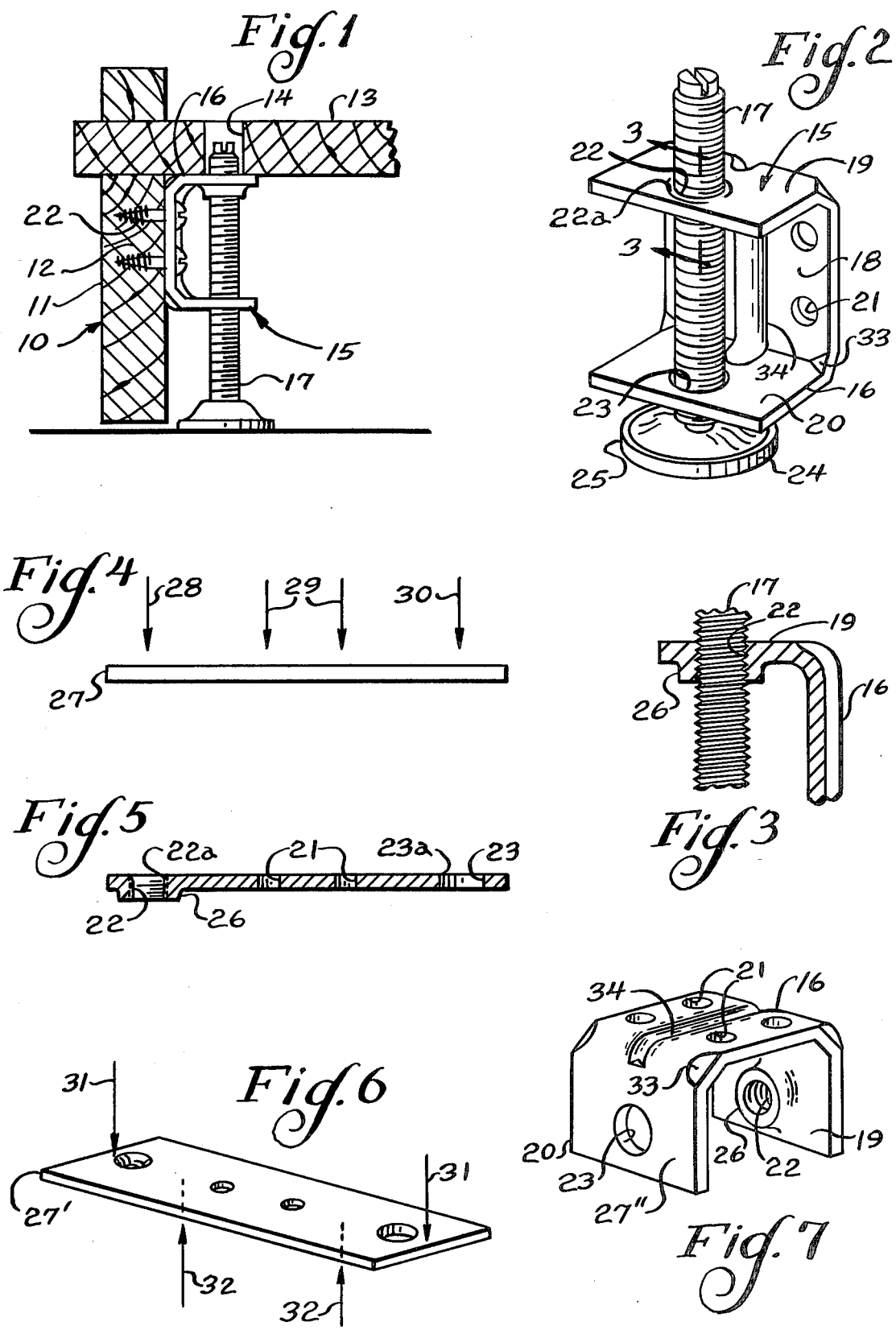

4,202,083

METHOD OF MAKING A FURNITURE LEVELING DEVICE

BACKGROUND AND SUMMARY OF INVENTION

This invention relates to a method of making a furniture leveling device and product and, more particularly, to a device which is installable within the furniture piece and can be adjusted without having to move, tilt, or otherwise handle the relatively heavy furniture piece.

Furniture leveling devices have been used for years wherein a foot-equipped bolt is supported within a bracket and unscrewed (or screwed) to provide for a leveling feature. In many instances, this required tilting or lifting of the furniture piece to perform the adjustment. However, this was not necessary where the leveling device could be mounted in a position under the furniture piece accessible through a vertical opening, i.e., an opening which accommodated the insertion of a screwdriver to make the adjustment upward or downwardly without the awkwardness and difficulty of lifting or tilting the furniture piece. Such devices, however, have not met with widespread acceptance because they failed in the principal objective to providing absolutely reliable leveling, often lacking sufficient rigidity so that a slight wobble or cant would develop. Therefore such otherwise advantageous devices were not preferred.

The disadvantageous operation characteristic of the prior art leveling devices has been overcome and an advantageous rigidification provided through the inventive method wherein at least one of the bolt-receiving openings is manufactured by a stamp extrusion so as to develop a depending metal throat supplying at least three threads for interrelation with the leveling bolt. Also, advantageous ribbing and gusseting are provided to further strengthen and rigidify the leveling device.

Other objects and advantages of the invention may be seen in the details set forth in the ensuing specification.

DETAILED DESCRIPTION

The invention is described in conjunction with an illustrative embodiment, in which FIG. 1 is a fragmentary elevational view, partially in section, of the furniture environment wherein the invention is employed;

FIG. 2 is a perspective view of the leveling device in a free-standing condition;

FIG. 3 is an enlarged fragmentary sectional view taken along the sight line 3—3 applied to FIG. 2;

FIG. 4 is a schematic view of the first stage of forming on a metal blank to develop the bracket seen in the preceding views;

FIG. 5 is a view of the blank after the first stamping operation has been performed;

FIG. 6 is a perspective view of the FIG. 5 blank and showing arrows representing the subsequent stage of shaping; and FIG. 7 is the shaped blank resulting from the activity schematically depicted in FIG. 6.

In the illustration given, and with reference first to FIG. 1, the numeral 10 designates generally a furniture piece having a right angled base support 11 providing a column part 12 and a beam part 13. This basic construction is found in modular furniture, wall units, case goods and stacking pieces, i.e., furniture pieces generally. The beam part 13 is equipped with a vertical hole 14 extending there through for the purpose of adjusting the leveling device generally designated 15. As can be best appreciated from a comparison of FIGS. 1 and 2, the device 15 includes a generally C-shaped bracket 16 which carries a vertically extending bolt 17. The bolt 17 is in alignment with the opening 14 so that a screwdriver inserted into the opening 14 can turn the bolt 17 and thereby adjust the position thereof relative to the bracket 16 and thereby raise or lower the furniture piece 10.

Still referring to FIGS. 1 and 2, it will be seen that the C-shaped bracket 16 includes a straight vertical part 18 connecting two horizontally extending arms 19 and 20. The vertical part 18 is equipped with a number of through openings or passages 21 which receive wood screws 22 (see FIG. 1) for securing the bracket 16 to the column part 12.

The bolt 17 is advantageously mounted in only the upper arm 19 as being threadably engaged with the walls of the opening 22. For this purpose, the bore of the opening 22 is somewhat smaller than the bore of the aligned openings 23 provided in the lower arm 20. The bolt 17 is advantageously equipped with a foot 24 which in turn is equipped with a plastic cup-shaped foot pad 25.

As mentioned previously, the bracket 16 in the arm portion 19 about the opening 22 is extruded to provide a depending throat 26 (see particularly FIGS. 3 and 5). This permits the development of at least three threads so that the bolt 17 is advantageously stabilized against wobble or other disadvantageous shifting.

In the manufacture of the device 15 according to the practice of the invention, a unitary generally rectangular blank 27 is initially provided (see FIG. 4). This is subjected to stamping forces as at 28, 29 and 30. The force 28 results in the development of the opening 22 (see FIG. 5), the forces 29 (more particularly the dies) develop the opening 21 while the force 30 develops the opening 23 (compare FIGS. 2 and 5).

Referring still to FIGS. 2 and 5, it will be noted that the extreme upper portion 22a of the wall defined in the opening 22 is somewhat rounded—this in comparison with the corresponding portion 23a of the wall defining the opening 23. This results from the use of different female dies during the stamping operation converting the blank from the FIG. 4 to the FIG. 5 configuration. A wider bore female die is employed in connection with the force 28 to develop the opening 22 and which results in a certain amount of metal being extruded as at 26.

After the configuration of blank of FIG. 5 has been realized (this being designated 27' in FIG. 6) the blank is subjected to forces 31 adjacent the ends and 32 centrally so as to convert the blank 27' from its planar configuration of FIG. 6 to the generally U-shape shown in FIG. 7 and designated by the numeral 27". Either simultaneously with the stamping developing the U-shape or subsequently, certain further rigidifying changes can be introduced into the bracket 16. These include gusset means at the four corners as at 33 (compare FIGS. 2 and 7) and a longitudinally extending rib 34 in the vertical part 18.

In one preferred illustrative version of the invention, the overall height of the bracket 16 is approximately 1⅝" (41.3 mm.). The bracket width (measured horizontally when installed as in FIG. 1) is approximately 1 7/16"

(36.5 mm.). The arms 19 and 20 are approximately 1⅛" long (28.6 mm.) while the overall length of the bolt 17 (including foot 24) is about 3¼" (82.6 mm.). The openings 22 and 23 are, respectively, ⅜" (9.5 mm.) and 7/16" (11.1 mm.). The length of the throat or extruded portion 26 is developed by utilizing a suitable female die so as to provide approximately 3 to 5 threads for the bolt 17. Thus, there is provided a rigidification of the bolt relative to the bracket and the bracket with respect to the various portions thereof, particularly through the gusset means 33 and the ribbing 34. The gusset means 33 are advantageously developed by upsetting the corners, i.e., the edges where the straight part 18 meets the arms 19 and 20 while the ribbing 34 is advantageously developed by a creasing force applied to the vertical part 18. By providing opening 23 slightly oversize (relative to the bolt 17) an advantageous stabilization is provided—particularly during furniture moving. Should the bolt tend to wobble, the walls of the opening 23 will prevent this from reaching any substantial amount—and thereby avoid damaging the threads.

While in the foregoing specification a detailed description of an embodiment of the invention has been set down for the purpose of illustration, many variations in the details hereingiven may be made by those skilled in the art without departing from the spirit and scope of the invention.

I claim:

1. A method of fabricating a leveling device for a furniture piece comprising stamping a first opening in a generally rectangular metal blank to provide a bore of predetermined diameter, stamping a second opening in said blank to provide a bore in diameter less than said predetermined diameter while extruding said blank thereabout to provide a depending metal throat, threading said second opening to provide at least three threads, shaping said metal blank into a generally C-shape to provide spaced arms containing said openings in aligned relation and installing a threaded bolt in said openings.

2. The method of claim 1 in which said C-shape has a straight part connecting said arms, and shaping said straight part with a rib extending between said arms.

3. The method of claim 2 in which said blank is shaped with gusset means between said arms and said straight part.

* * * * *